US005999519A

United States Patent [19]
Basile et al.

[11] Patent Number: 5,999,519

[45] Date of Patent: Dec. 7, 1999

[54] DUAL CHANNEL HIGH SPEED WIRELESS DATA TRANSFER DEVICE

[75] Inventors: Philip C. Basile, Great Falls, Va.; John W. Roberts, Mullica Hill, N.J.; Stephen J. Tansky, Ashburn, Va.

[73] Assignee: Geo-Com, Incorporated, Reston, Va.

[21] Appl. No.: 08/901,073

[22] Filed: Jul. 28, 1997

[51] Int. Cl.[6] .......... H04B 7/00

[52] U.S. Cl. .......... 370/310

[58] Field of Search .......... 455/313, 102, 455/103, 73; 370/316, 319, 310, 315, 339, 343, 344

[56] References Cited

U.S. PATENT DOCUMENTS

| | | | |
|---|---|---|---|
| 5,535,432 | 7/1996 | Dent | 455/77 |
| 5,625,624 | 4/1997 | Rosen et al. | 370/307 |
| 5,659,891 | 8/1997 | Hays et al. | 455/103 |
| 5,663,957 | 9/1997 | Dent | 370/347 |
| 5,719,857 | 2/1998 | Heikknen | 370/330 |

*Primary Examiner*—Chau Nguyen
*Assistant Examiner*—Ali Zamani
*Attorney, Agent, or Firm*—Mayer, Fort Kort & Williams, LLC; Michael P. Fortkort

[57] ABSTRACT

A millimeter wave link provides a means for easily transporting multiple high speed data channels, in excess of 100 Mb/s, a distance of up to 10 km, without requiring elaborate modulators and demodulators. This invention also provides fast setup, versatility, and is portable, which makes it desirable for field use. In addition, it can be set up for long term high speed data collection in a virtually permanent environment. The unidirectional link of the present invention is intended for use in experimental data collection systems, where portability, ease of setup and high speed data transfer are required. University environments as well as independent research and development institutions can benefit significantly from its use.

3 Claims, 5 Drawing Sheets

DUAL CHANNEL HIGH SPEED WIRELESS DATA TRANSFER DEVICE

BACKGROUND OF THE INVENTION

The present invention relates generally to digital communication systems and more particularly to a wireless digital communication system.

The use of low cost, portable, short haul high speed data transmission equipment has significant data collection advantages when observing and evaluating scientific data in real time from remote locations. This is especially desirable when processing analog inputs, which are digitally transformed in real time, such as digital signal processing (DSP) signals. This type of data collection often requires fast computational analysis, and immediate conversion back to real time for proper evaluation. Often data is taken at remote locations, such as antenna ranges or mobile sites, where the computing or DSP equipment cannot be co-located with the data collection equipment and thereby a portable data relay must be incorporated to satisfy the data collection requirements.

High speed data transfer has traditionally been achieved via fiber optic land lines or elaborate microwave relay links. Fiber optic systems require a substantial investment in equipment and cable routing and are not portable. Fiber optic systems also require alteration to the landscape in order to bury a cable, which is often forbidden in certain areas. At a minimum burying a cable presents a major inconvenience.

Traditional microwave links are relatively expensive and require bulky antennas and transceivers, which do not easily adapt to a mobile environment. RF data transfer above 50 Mb/s require a substantially higher carrier frequency than the data rate itself, which almost always requires the use of microwave and millimeter wave frequencies. In addition, most microwave links require the data to be pre-processed by elaborate modulators prior to transmission. A similar elaborate demodulation process must also take place at the receiver. Consequently, most applications cannot afford the complexity of a microwave link.

The present invention is therefore directed to the problem of developing a wireless digital communications system that is portable, easily installed in the field, relatively inexpensive and transfers a high data rate.

SUMMARY OF THE INVENTION

The present invention solves this problem by providing a undirectional millimeter wave link whose carrier frequency operates at about 40 Gigahertz, which provides significant bandwidth available for use as the channel.

According to the present invention, a portable wireless communication device for relaying high speed data over a relatively short distance at a transmit frequency in excess of approximately 40 Gigahertz includes a first modulator with an input port receiving high speed data at a data rate up to approximately 155 Megabits per second, bi-phase modulating the data on a first carrier frequency and translating a resulting signal to a frequency in excess of 1 Gigahertz, a second modulator with an input port also receiving high speed data at a data rate up to approximately 155 Megabits per second, and bi-phase modulating the data on a second carrier frequency, which is separated from the first carrier frequency by approximately 300 Megahertz, and translating the resulting signal to a frequency in excess of approximately 1 Gigahertz, a transmitter including a power combiner forming a combined signal from the bi-phase modulated data on the first carrier frequency output by the first modulator and the bi-phase modulated data on the second carrier frequency output by the second modulator, and an upconverter translating the combined signal output from the power combiner up in frequency to a frequency in excess of approximately 40 Gigahertz, an antenna being coupled to the transmitter and radiating an RF signal in excess of approximately 40 Gigahertz, said antenna including a micro patch antenna array having a plurality of individual antenna elements with a linear field distribution across said plurality of elements, said linear field distribution reducing a first five to ten significant side lobes, while maintaining acceptable antenna efficiency, an input port being coupled to the transmitter, and a corporate antenna feed system distributing RF power from the antenna input port to each of the plurality of individual antenna elements, and a case containing the first modulator, the second modulator, the transmitter, and the transmit antenna, said case having a size of approximately twelve inches by twelve inches by six inches.

In addition, according to the present invention, a portable wireless communication device for receiving high speed data from a corresponding transmitting device relayed over a relatively short distance at a transmit frequency in excess of approximately 40 Gigahertz includes an antenna for receiving an RF signal in excess of approximately 40 Gigahertz, said antenna including a micro patch antenna array having a plurality of individual antenna elements with a linear field distribution across said plurality of elements, said linear field distribution reducing a first five to ten significant side lobes, while maintaining acceptable antenna efficiency, an output port outputting a signal in excess of 40 Gigahertz, and a corporate antenna feed system distributing RF power from each of the plurality of individual antenna elements to the output port, a receiver being coupled to the output port of the antenna, receiving two bi-phase signals, which are equally spaced about a center frequency in excess of approximately 40 Gigahertz, said receiving including a down converter translating the input signal down to a center frequency of approximately one Gigahertz, and a filter separating the two bi-phase signals into two IF channels at approximately 300 Megahertz, a first demodulator being coupled to the receiver and converting one of the two IF channels into a non-return-to-zero coded signal, a second demodulator being coupled to the receiver and converting the other of the two IF channels into a non-return-to-zero coded signal and a case containing the first modulator, the second modulator, the transmitter, and the transmit antenna, said case having a size of approximately twelve inches by twelve inches by six inches.

The unidirectional millimeter wave link described herein provides a means for easily transporting multiple high speed data channels, in excess of 100 Mb/s, a distance of up to 10 km, without requiring elaborate modulators and demodulators. This invention also provides fast setup, versatility, and is portable, which makes it desirable for field use. In addition, it can be set up for long term high speed data collection in a virtually permanent environment.

The unidirectional link of the present invention is intended for use in experimental data collection systems, where portability, ease of setup and high speed data transfer are required. University environments as well as independent research and development institutions can benefit significantly from its use.

One potential application is as an entry into the Internet for businesses. Currently, T1 links are very expensive, and operate at data rates that can quickly become to slow. Thus, the present invention enables a business to access the Internet over a very high speed data link for the cost of leasing a T1 line for only about one month.

DETAILED DESCRIPTION

Figure 1:
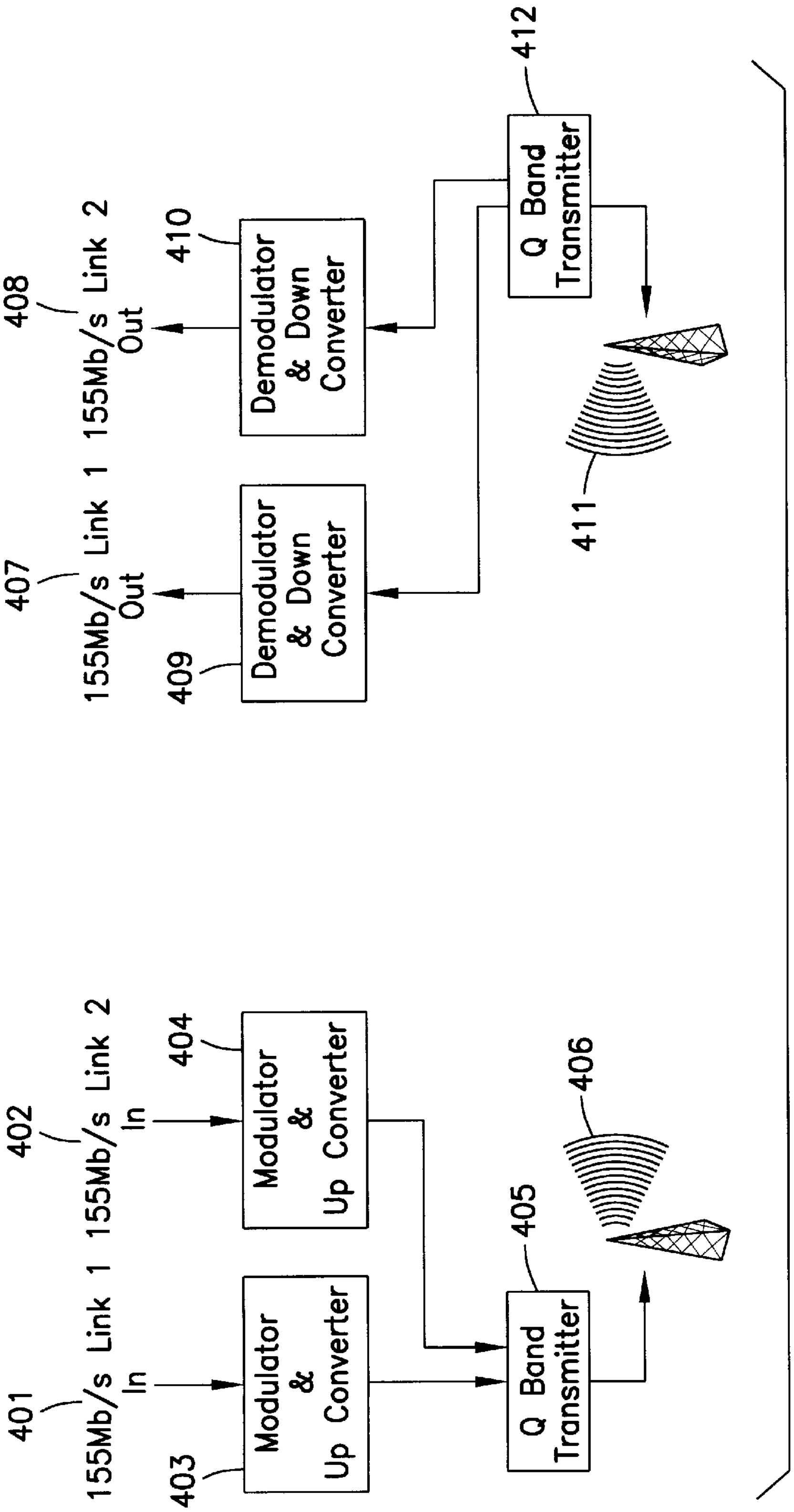
FIG. 1 depicts a block diagram of the overall system of the present invention.

The wireless data transfer device consists of a unidirectional transmission system and a unidirectional receiver system. The overview block diagram is shown in FIG. 1. The system includes dual modulators 403, 404 feeding a single Q band transmitter 405. The system is designed so that the most expensive part of the system—the Q band transmitter 405—is used only once, and the least expensive part is used repetitively, as necessary, i.e., the modulator 403, 404. The same concept is applied to the receiver design, where a single Q band receiver 412 is used to feed two demodulators 409, 410.

Data streams 401, 402 having bit rates up to 155 Megabits per second (Mb/s) are input to the Modulators and Up Converters 403, 404. The Modulators and Up Converters 403, 404 impress the data on the carriers and translate the resulting frequency signal to a higher frequency. The signals are then modulated by the transmitter 405, and the resulting signal is output to the antenna 406.

At the receive side, the signal is received by the antenna 411, and passed to the receiver 412. The receiver 412 takes the low level signal produced by the antenna 411 and converts it to two identical RF signals. The Demodulators and Down Converters 409, 410 convert the signals to baseband and demodulate the data to create the original data streams 401, 402, which are indicated by 407, 408.

System Overview

The system of the present invention includes two modulators and up converters, which enable two data streams to be input to the system for transmission. Each of these data streams can have a bit rate of up to 155 Mb/s.

The data is encoded in independent non return to zero (NRZ) format, and the data is input into the data ports 401 and/or 402. These ports accept data rates up to 155 Mb/s. Data can be present at only one port or both ports for continuous operation. Modulators 403 and 404 impress the data onto separate carrier frequencies separated by approximately 450 MHZ. The data is bi-phase modulated during this operation.

The carriers are then frequency division multiplexed onto a Q-band transmitter 405. The output power from the transmitter is approximately 200 mw. The signal from the transmitter is then input into antenna 406.

The antenna 406 is a high gain flat plane micropatch array. Flatplane antennas are relatively inexpensive to produce and require less than 1 inch of depth clearance. The receiving antenna 411 can be located from 0.1 to 10 km from the transmitting antenna. The receiving antenna is identical to the transmitting antenna. A precision pointing angle of less than 2 degrees must be maintained for signal reception.

The receiver 412 contains a low noise amplifier to remove signals buried in noise, and a phase locked down converter, which provides a first intermediate frequency (IF) of approximately 1 GHz. Item 412 also splits the multiplexed data channels into 2 individual intermediate frequency paths.

Demodulators 409 and 410 provide a second IF conversion down to approximately 325 MHZ, provide carrier recovery and bi-phase demodulation, and thus re-produce the transmitted NRZ formatted data.

Each of the individual modules will now be described in more detail.

Q-Band Transmitter

Figure 2:
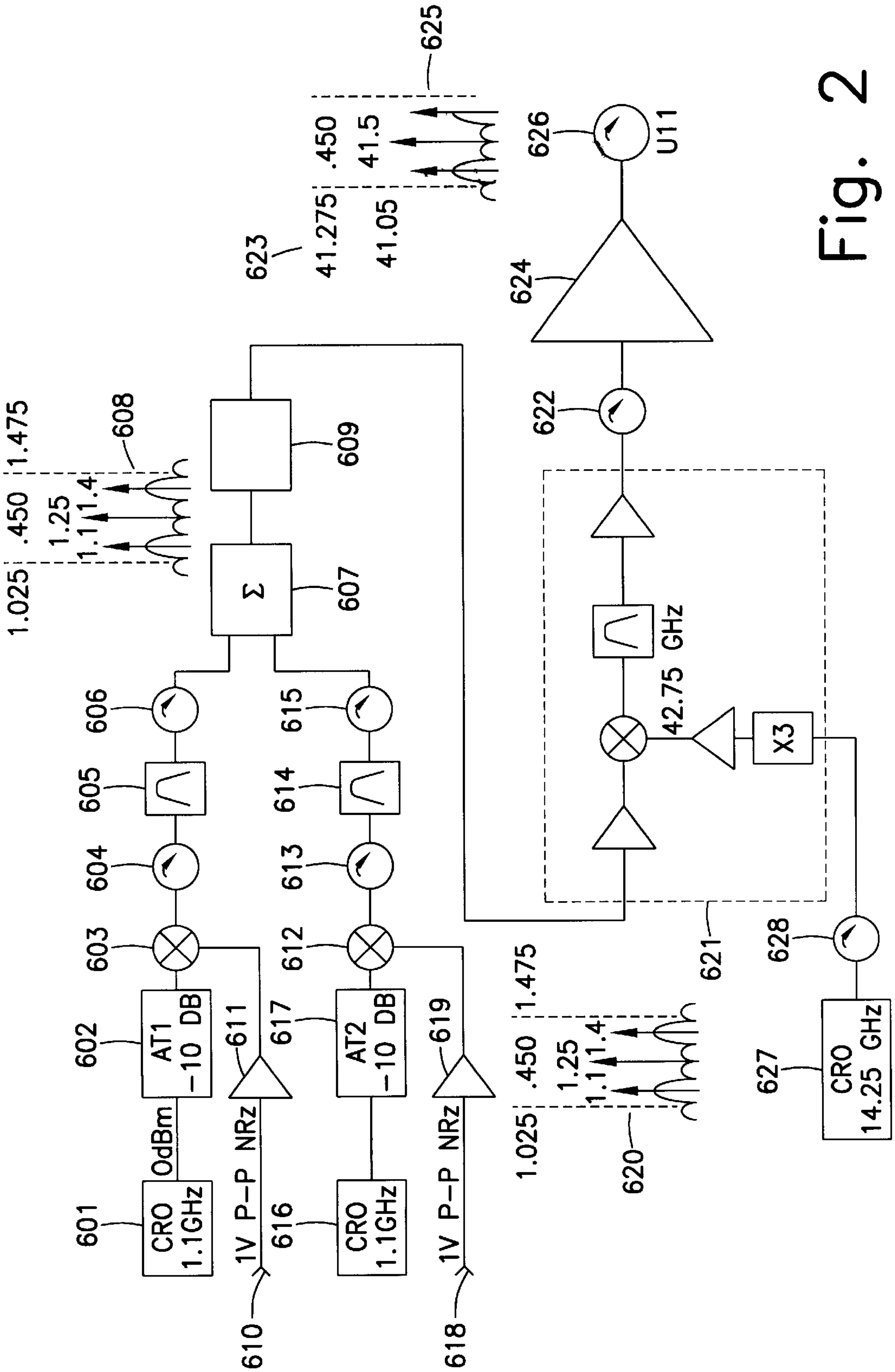
FIG. 2 depicts the transmitter block diagram of the transmitter used in the present invention.

Turning to FIG. 2, high speed NRZ data from a generic serial data stream generation device (or data source) enters port 610 or port 618 at a 1 volt peak-to-peak (p-p) level. The data is buffered and level shifted by amplifiers 611 and 619 prior to biphase modulation on separate carriers via double balanced mixers 603 and 612. Two individual carriers at 1.1 and 1.4 MHZ are generated by crystal resonating oscillators (CRO) 601 and 616. The CRO's are extremely stable and contain very little phase noise. Fixed attenuators 602 and 617 reduce the levels of the CRO's to be compatible with the double balanced mixers, thus maintaining unwanted mixer products at a minimum level.

The modulated signal from each mixer is then bandpass filtered via filters 605 and 614, each centered at the respective CRO frequency. The circulators 604, 606, 613 and 615 provide inband as well as out of band impedance matching from the filters 605, 614 to both the modulators and the power summation circuit 607. Power combiner 607 combines the power at 1.1 and 1.4 GHz on to a single output. Insert 608, shows the resulting spectrum, centered about 1.25 GHz. The adjustable attenuator 609 sets the final transmitted output level. The millimeter wave upconverter 621 translates the two modulated carriers at 1.1 and 1.4 GHz to the transmit frequency of 41.5 GHz. A CRO 627 provides the reference frequency for the millimeter wave translation. The CRO frequency is multiplied by a factor of three in the upconverter in order to produce the final output frequency. Circulator 628 provides impedance compatibility between the upconverter and the CRO. The RF level at the output of the upconverter is approximately 1 mw and is amplified by the power amplifier 624 to its final transmit power level of 200 mw. Elements 622 and 626 provide impedance compatibility between the upconverter and the antenna respectfully.

Antenna

Figure 3:
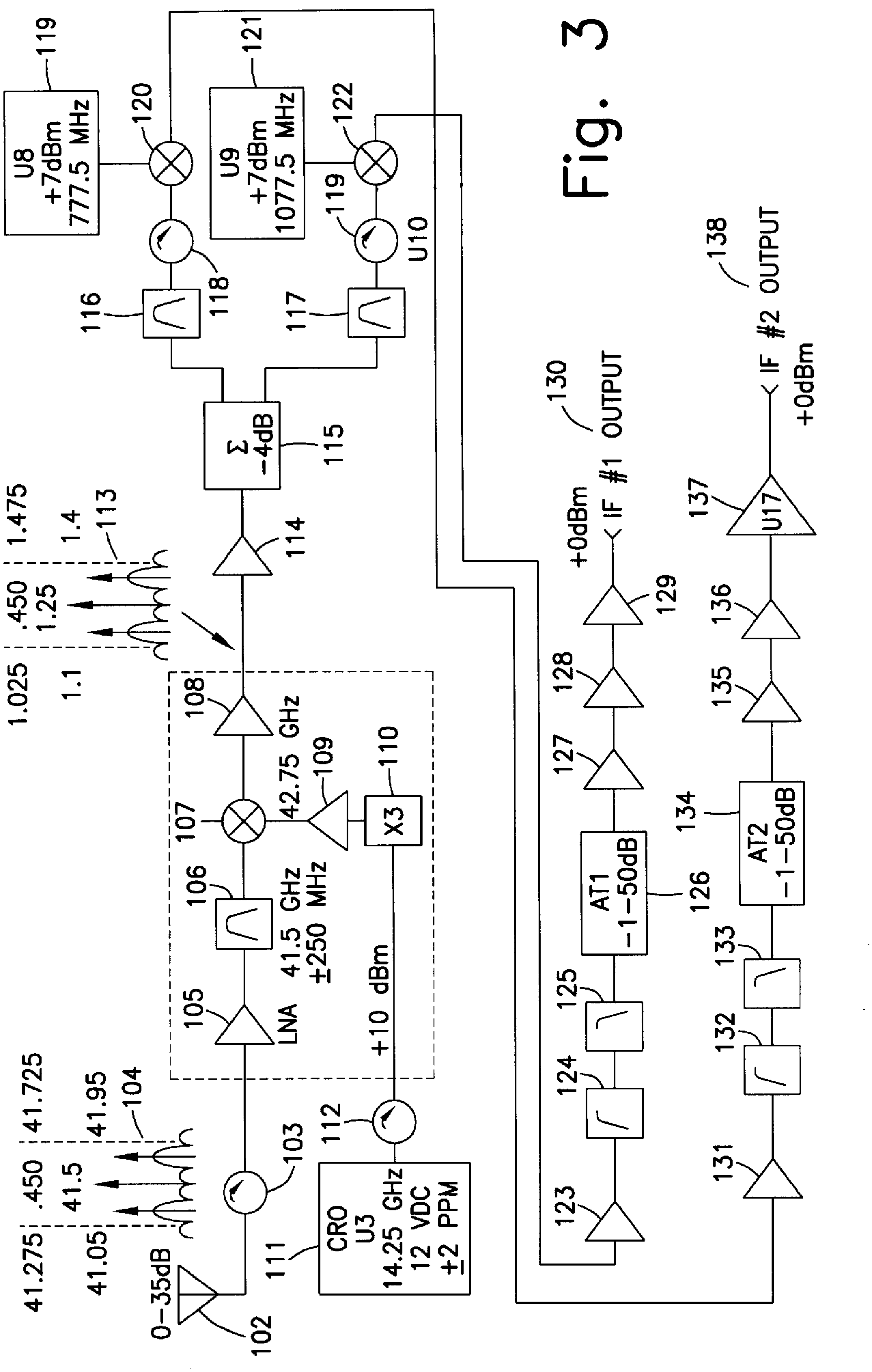
FIG. 3 depicts the block diagram of the receiver used in the present invention.

The transmit antenna 406 is a flat plane micro patch array, and the receive antenna 411 is identical to the transmit antenna. Insert 623 shows the final transmitted spectrum, which is then demodulated by the receiver. Turning to FIG. 3, two bi-phased modulated signals enter a flat plane antenna 102. The flat plane antenna 102 has approximately 31 to 35 dB of gain and a 2 degree beamwidth.

The antenna for the high speed data link utilizes a flat plane printed circuit architecture. Flat plane antennas require a minimal amount of depth and provide a flat surface for mounting the down conversion and demodulator electronics.

The antenna is composed of a 12"×12" micro patch antenna array, with a linear field distribution across the elements. The linear field distribution reduces the first five to ten significant side lobes, while maintaining acceptable antenna efficiency. A corporate antenna feed system, distributes RF power from the antenna input port to each of the individual antenna elements. The reduction of sidelobes is a major consideration in preventing interference when many independent point to point links are deployed in close proximity.

Q-Band Receiver

Output from the receiving antenna 411 are two bi-phase signals, which are equally spaced about a Q-band center frequency at approximately 41.5 GHz, with a center to center modulated carrier distance of 450 MHZ, as shown in the insert illustration 104. The signal passes into the receiver via an isolator 103, which minimizes reflections between the antenna and the low noise amplifier 105. The down converter consists of elements 105, 106, 107, 108, 109 and 110. The down converter translates the 41.5 GHz input signal down to a center frequency of 1.25 GHz, as shown in the insert illustration of item 113. Amplifier 114 amplifies the signal in order to preserve the noise figure prior to the separation of the two bi-phase signals into individual IF channels. Filters 116 and 117, which are of the bandpass variety, isolators 118 and 119, double balanced mixers 120 and 122, and oscillators 119 and 121 provide conversion of the first IF at 1.25 GHz to dual 322.5 MHZ channels. This is chosen so that the remaining components can be identical, which saves cost. Oscillators 119 and 121 are phased locked oscillators, which provide the correct frequency for conversion to the 322.5 MHZ second IF. Amplifiers 124 through 129 and 131 through 137 are identical in design and amplify the 322.5 MHZ signals, provide filtering, and insert the proper attenuation in order to maintain the output at a 0.0 dBm level with a minimum of distortion. Output ports 130 and 138 contain the bi-phase modulated RF and are utilized as the input signals to dual demodulators, which recover the baseband data from the modulated carriers.

Demodulator and Down Converter

Figure 4:
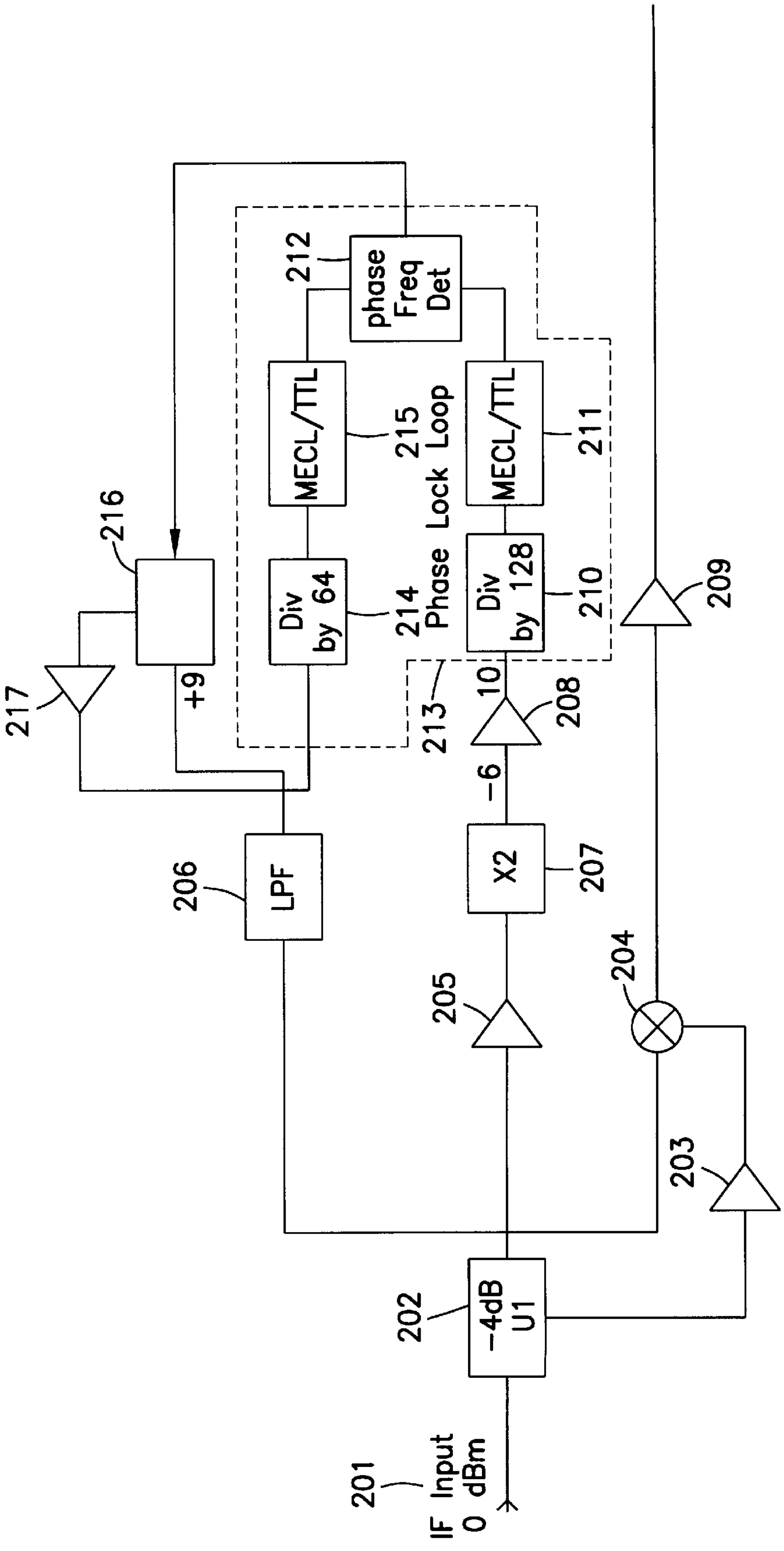
FIG. 4 depicts the block diagram of the demodulator used in the present invention.

The outputs from the receiver ports 130 and 138 are input to two identical demodulator circuits, of which one is shown in FIG. 4. The demodulator receives the RF bi-phase modulated carrier at port 201 and provides an NRZ output at port 213. The RF signal enters the demodulator at port 210 at a 0.0 dBm level. The signal is then power split into two equal components by splitter 202. One component of the signal enters amplifier item 203 and a double balanced mixer 204, which is used for demodulation and recovery of the actual data. The second portion of the signal, which is split by splitter 202, is used to recover the unmodulated carrier via amplifier 205, and frequency doubler 207. The unmodulated carrier is phased locked via the phased locked loop 218, which provides a signal to noise improvement of the carrier which is in turn creates a pilot signal, which is then mixed with the modulated carrier present in item 204 to produce the baseband data. The phase locked loop 218 contains a VCO reference 216, a frequency divider 214 for the VCO reference 216, a divider for the recovered carrier 210, level converters items 211 and 215 and a phase detector item 212. The VCO reference 216 is divided by 64 by divider 214 to produce an input into the phase detector 212, which is equal to the recovered carrier that is itself divided by 128. The phase detector 212 creates a DC error voltage, which keeps the VCO 216, frequency and phase coherent with the recovered carrier, thus providing a reference for demodulation, which is virtually noise free.

Packaging of the System

Figure 5:
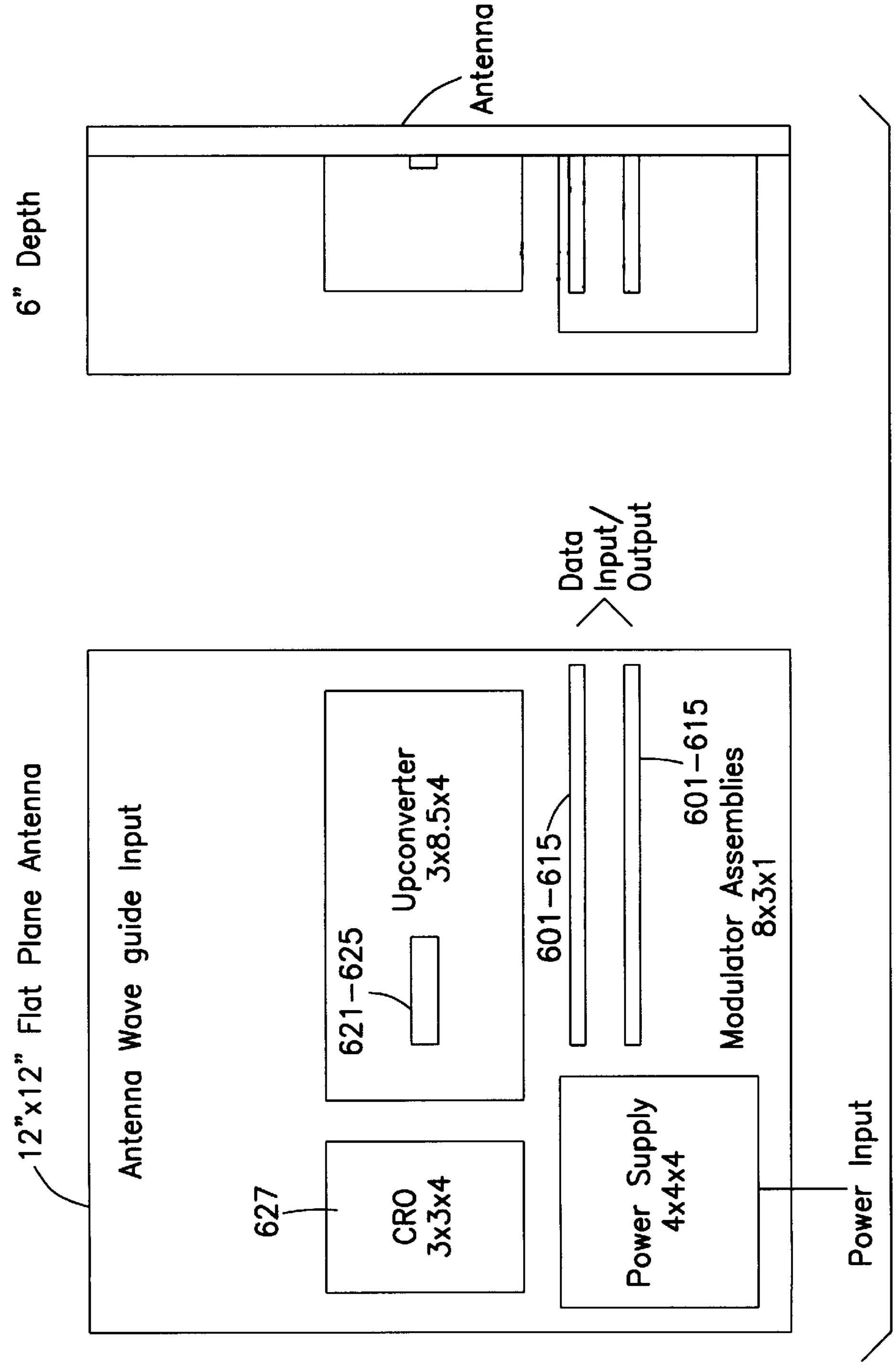
FIG. 5 depicts the layout of the present invention.

FIG. 5 depicts the physical layout of the transmitter and receiver when mounted with the antenna. The total volume for the transmitter and the receiver electronics will be identical. This is an advantage of the selected architecture. Complementary receive and transmit components, such as the down converter, dual channel receiver and demodulator have similar counterparts in the transmitter, such as the up converter, the dual channel IF input and the modulator. The entire unit will fit into a 12"×12"×6" enclosure. The demodulator and the down converter can also be assembled within the same size constraints.

Power

The transmit and receive assemblies utilize 115 VAC prime power. Approximately 20 watts of power is required for the total. Switching power supplies are utilized on both units. The antenna structure also serves as the baseplate for power supply heat dissipation. Switching power supply efficiencies of approximately 85% are expected.

Parts List

The key items for the transmit and receive sections are listed in the table below.

| Item | Description | Manufacturer | Part Number |
|---|---|---|---|
| 624 | Power Amplifier | DBS | DBP-4042N823 |
| 621 | Upconverter | DBS | DUC-4042N810 |
| 105–110 | Downconverter | DBS | DDC-4042N610 |
| 116, 117 | filters | K&L | SMP series |
| 124, 125 | filters | K&L | SMP series |
| 120, 121 | mixers | Minickts | SCM series |
| 123, 127 | Amplifiers | Minickts | MAR series |
| 128, 129 | | | |
| FIG. 200 | Demodulator | Motorola Minickts | Various Integrated circuits, mixers and couplers |

Advantages of Architecture

The architecture of the present invention supports the transmittal of a plurality of independent modulated carrier signals, not limited to two. When the modulated carriers are transmitted using the architecture shown in FIG. 2, relaxed inter-modulation requirements can be imposed on the transmit amplifier 624, allowing the amplifier 624 to operate in a saturated state for added efficiency. This is due to the minimal inter-modulated interaction between the two carriers However, when more than two carriers are utilized, then item 624 must transmit in the linear state. This is achieved by simple adjustment of the power output level in relation to the saturation point. As the carriers are increased, the transmit power will be equally proportioned among the individual carrier power providing less power per carrier. Although the link range decreases with the addition of carriers, this type of architecture has the advantage of utilizing the same hardware for one two, or multiple carriers with maximum transmit power efficiency for all modes of operation. Another advantage to this architecture is that as additional modulated carriers are added, only the low cost IF hardware must be added to support the additional carriers. These items are the blocks preceding item 607 in FIG. 2 and the items following item 115 in FIG. 3. The high cost millimeter wave hardware remains unchanged.

In addition, the transmit architecture and receive architecture are complementary. They share identical IF frequencies, which allows a single part, such as first IF filters, items 116, 117, 605 and 614 to be common. This provides a significant cost advantage. The dual common second IF in the receiver also provides part redundancy, further reducing cost. A simple modulation and demodulation scheme using BPSK requires minimal hardware, requires no conditioning of the input data and provides the best Bit Error Rate of all possible modulation schemes. The output data is demodulated using only a carrier recovery circuit and a balanced mixer, thus further reducing complexity and cost.

The use of a flat plane antenna design has a significant advantage over designs that utilize parabolic dishes, horn antennas or lens antennas. The flat plane antenna has a significantly low recurring cost after initial design. The design is printed on a millimeter wave circuit board material, which reduces labor and requires no tuning. This reduces the cost of conventional antennas from a several thousand dollars to under one thousand dollars. The flat plane design also provides a mounting area for all the required circuitry, including the power supply. This further reduces cost by minimizing mechanical assemblies and the labor involved in assembly. This concept also reduces the overall depth of the unit, making it attractive for desktop or window sill installations. In summary, this design reduces cost, while providing transmit data capability beyond current portable hardware. This is achieved via transmit/receive design symmetry, utilization of a flat plane antenna and selection of BPSK modulation.

SUMMARY

The present invention enables short haul, high data rate wireless transmission that can be installed quickly and easily. As a result, inexpensive transmission links can be set up by companies, universities and governments to enable network communications, data collection, voice and data traffic and video conferencing. The millimeter wave link of the present invention provides a means for easily transporting multiple high speed data channels, in excess of 100 Mb/s, a distance of up to 10 km, without requiring elaborate modulators and demodulators. The present invention also provides fast setup, versatility, and portability, which makes it desirable for field use. In addition, it can be set up for long term high speed data collection in a virtually permanent environment. The unidirectional link of the present invention is intended for use in experimental data collection systems, where portability, ease of setup and high speed data transfer are required. University environments as well as independent research and development institutions can benefit significantly from its use. Other applications of the present invention will become apparent to those of skill in the art; the present invention is not limited to those mentioned specifically herein but only by the accompanying claims.

What is claimed is:

1. A portable wireless communication device for relaying high speed data over a relatively short distance at a transmit frequency in excess of approximately 40 Gigahertz comprising:

a) a first modulator including a first input port receiving high speed data at a data rate up to approximately 155 Megabits per second, bi-phase modulating the data on a first carrier frequency and translating a resulting signal to a frequency in excess of 1 Gigahertz;

b) a second modulator including a second input port receiving high speed data at a data rate up to approximately 155 Megabits per second, bi-phase modulating the data on a second carrier frequency, which is separated from the first carrier frequency by approximately 300 Megahertz, and translating a resulting signal to a frequency in excess of approximately 1 Gigahertz;

c) a transmitter being coupled to the first and second modulators, said transmitter including:

(i) a power combiner forming a combined signal from the bi-phase modulated data on the first carrier frequency output by the first modulator and the bi-phase modulated data on the second carrier frequency output by the second modulator; and (ii) an upconverter translating the combined signal output from the power combiner up in frequency to a frequency in excess of approximately 40 Gigahertz;

d) an antenna being coupled to the transmitter and radiating an RF signal in excess of approximately 40 Gigahertz, said antenna including:

(i) a micro patch antenna array having a plurality of individual antenna elements with a linear field distribution across said plurality of elements, said linear field distribution reducing a first five to ten significant side lobes, while maintaining acceptable antenna efficiency;

(ii) an input port being coupled to the transmitter; and (iii) a corporate antenna feed system distributing RF power from the antenna input port to each of the plurality of individual antenna elements; and e) a case containing the first modulator, the second modulator, the transmitter, and the transmit antenna, said case having a size of approximately twelve inches by twelve inches by six inches.

2. A portable wireless communication device for receiving high speed data from a corresponding transmitting device relayed over a relatively short distance at a transmit frequency in excess of approximately 40 Gigahertz comprising:

a) an antenna for receiving an RF signal in excess of approximately 40 Gigahertz, said antenna including:

(i) a micro patch antenna array having a plurality of individual antenna elements with a linear field distribution across said plurality of elements, said linear field distribution reducing a first five to ten significant side lobes, while maintaining acceptable antenna efficiency;

(ii) an output port outputting a signal in excess of 40 Gigahertz; and (iii) a corporate antenna feed system distributing RF power from each of the plurality of individual antenna elements to the output port;

b) a receiver being coupled to the output port of the antenna, receiving two bi-phase signals, which are equally spaced about a center frequency in excess of approximately 40 Gigahertz, said receiving including:

(i) a down converter translating the input signal down to a center frequency of approximately one Gigahertz; and (ii) a filter separating the two bi-phase signals into two IF channels at approximately 300 Megahertz;

c) a first demodulator being coupled to the receiver and converting one of the two IF channels into a non-return-to-zero coded signal;

d) a second demodulator being coupled to the receiver and converting the other of the two IF channels into a non-return-to-zero coded signal; and e) a case containing the first modulator, the second modulator, the transmitter, and the transmit antenna, said case having a size of approximately twelve inches by twelve inches by six inches.

3. A portable communication system comprising:

a) a transmitting device for relaying high speed data over a relatively short distance at a transmit frequency in excess of approximately 40 Gigahertz including:

(i) a first modulator including a first input port receiving high speed data at a data rate up to approximately 155 Megabits per second, bi-phase modulating the data on a first carrier frequency and translating a resulting signal to a frequency in excess of 1 Gigahertz;

(ii) a second modulator including a second input port receiving high speed data at a data rate up to approximately 155 Megabits per second, bi-phase modulating the data on a second carrier frequency, which is separated from the first carrier frequency by approximately 300 Megahertz, and translating a resulting signal to a frequency in excess of approximately 1 Gigahertz, (iii) a transmitter being coupled to the first and second modulators, said transmitter having:

(1) a power combiner forming a combined signal from the bi-phase modulated data on the first carrier frequency output by the first modulator and the bi-phase modulated data on the second carrier frequency output by the second modulator; and (2) an upconverter translating the combined signal output from the power combiner up in frequency to a frequency in excess of approximately 40 Gigahertz;

(iv) an antenna being coupled to the transmitter and radiating an RF signal in excess of approximately 40 Gigahertz, said antenna having:

(1) a micro patch antenna array having a plurality of individual antenna elements with a linear field distribution across said plurality of elements, said linear field distribution reducing a first five to ten significant side lobes, while maintaining acceptable antenna efficiency;

(2) an input port being coupled to the transmitter; and (3) a corporate antenna feed system distributing RF power from the antenna input port to each of the plurality of individual antenna elements; and (v) a case containing the first modulator, the second modulator, the transmitter, and the transmit antenna, said case having a size of approximately twelve inches by twelve inches by six inches; and b) a receiving device for receiving high speed data from the transmitting device relayed over a relatively short distance at a transmit frequency in excess of approximately 40 Gigahertz including:

(i) an antenna for receiving an RF signal in excess of approximately 40 Gigahertz, said antenna including:

(1) a micro patch antenna array having a plurality of individual antenna elements with a linear field distribution across said plurality of elements, said linear field distribution reducing a first five to ten significant side lobes, while maintaining acceptable antenna efficiency;

(2) an output port outputting a signal in excess of 40 Gigahertz; and (3) a corporate antenna feed system distributing RF power from each of the plurality of individual antenna elements to the output port;

(ii) a receiver being coupled to the output port of the antenna, receiving two bi-phase signals, which are equally spaced about a center frequency in excess of approximately 40 Gigahertz, said receiving including:

(1) a down converter translating the input signal down to a center frequency of approximately one Gigahertz; and (2) a filter separating the two bi-phase signals into two IF channels at approximately 300 Megahertz;

(iii) a first demodulator being coupled to the receiver and converting one of the two IF channels into a non-return-to-zero coded signal;

(iv) a second demodulator being coupled to the receiver and converting the other of the two IF channels into a non-return-to-zero coded signal; and (v) a case containing the first modulator, the second modulator, the transmitter, and the transmit antenna, said case having a size of approximately twelve inches by twelve inches by six inches.

* * * * *